United States Patent [19]
Kiener et al.

[11] 4,372,628
[45] Feb. 8, 1983

[54] BEARING ASSEMBLY

[75] Inventors: Heinz Kiener, Waigolshausen; Günter Neder, Schweinfurt; Rainer Schürger, Schwanfeld, all of Fed. Rep. of Germany

[73] Assignee: SKF Kugellagerfabriken GmbH, Schweinfurt, Fed. Rep. of Germany

[21] Appl. No.: 273,607

[22] Filed: Jun. 15, 1981

[30] Foreign Application Priority Data

Jun. 28, 1980 [DE] Fed. Rep. of Germany ....... 3024397

[51] Int. Cl.³ .............................. F16C 33/76
[52] U.S. Cl. ............................. 308/187.1; 308/189 R
[58] Field of Search ................ 308/187.1, 36.1, 36.2, 308/36.3, DIG. 14, 189 R, 191; 277/15, 22, 94, 95

[56] References Cited

U.S. PATENT DOCUMENTS

| 2,165,155 | 7/1939 | Schmal | 308/187.1 X |
| 2,320,794 | 6/1943 | Pew | 308/187.1 |
| 2,639,954 | 5/1953 | Potter | 277/95 X |
| 3,639,016 | 2/1972 | Bourgeois | 277/95 X |
| 4,118,080 | 10/1978 | Kregler et al. | 308/187.1 |

FOREIGN PATENT DOCUMENTS 908430 2/1954 Fed. Rep. of Germany ... 308/187.1

Primary Examiner—Stuart S. Levy
Assistant Examiner—Daniel P. Stodola
Attorney, Agent, or Firm—Eugene E. Renz, Jr.

[57] ABSTRACT

In a bearing assembly particularly for wheel bearings comprising an inner ring having at least one radially outwardly directed fastening flange, an outer ring and a plurality of rolling elements in the annular space between the rings, a cap secured to the inner ring having a radial section extending between the outer ring and fastening flange and a seal ring fastened to the outer ring which slides on the cap, means defining at least one space between the radial cap section and the fastening flange of said inner ring, said space being filled at least partly with means which inhibits heat transfer from the inner ring to the cap.

11 Claims, 4 Drawing Figures

BEARING ASSEMBLY

BACKGROUND AND SUMMARY OF THE INVENTION

The present invention relates to new and useful improvements in rolling bearings particularly for wheel bearing assemblies consisting of an inner ring having at least one radially outwardly directed flange for mounting the rim of the wheel, an outer ring and a plurality of rolling elements in the annular space between the rings and a cap secured to the inner ring having a radial section extending between the outer ring and the fastening flange and a seal ring secured to the outer ring which slides on the cap.

This general type of bearing assembly is not new per se as exemplified by the bearing arrangement shown in the German Utility Pat. No. 7,434,724. In this roller bearing, the radial section of the cap fits against the fastening flange of the inner ring and therefore covers the axially extending openings in the flange for the bolts mounting the wheel. A disadvantage, however, of this assembly, is that the seal ring which slides on the radial section of the cap, which is typically provided with an elastic sealing lip of a temperature sensitive material, for example, plastic, must endure relatively high operating temperatures when heat sources are present at the inner ring. In some cases this causes undue heating of the seal. For example, severe heating occurs when the roller bearing is filled with an excessive amount of lubricant or the inner ring tends to build excessive heat as a result of connected friction couplings or friction brakes where the inner ring dissipates the friction heat generated. A relatively high temperature can especially occur at the inner ring of the roller bearing which is connected to a disc brake and in these instances, the radial section of the cap may be heated to such an extent that the seal ring slides on this section and rises to such elevated temperatures to cause premature failure as a result of the sliding wear.

With the foregoing in mind, an object of the present invention is to provide improved roller bearing construction of the above mentioned type which eliminates overheating of the seal ring at its sliding location on the cap even when high temperatures are generated on the inner ring. This is achieved in accordance with the present invention by providing at least one space between the radial section of the cap and the fastening flange which space is filled at least in part with means for inhibiting the heat transfer from the inner ring to the cap. The filler means may simply comprise air which is circulated through the space or filling the space with a material having low heat conductivity. In accordance with the present invention therefore, the heat transfer between the radial section of the cap and the axially opposing fastening flange is inhibited. Thus, the radial section and the immediately adjacent sections of the cap are at a low operating temperature even when the inner ring is subjected to high loads. The arrangement therefore, eliminates the danger inherent in prior assemblies; that is, excessive heating of the seal ring which slides and rubs on the cap at its sliding location and failure of the seal ring after a short running time as a result of wear and/or thermal decomposition which may be exhibited, for example, as embrittlement of the plastic sealing lip.

Heat conduction from the fastening flange to the cap may be inhibited by using a gaseous, a liquid, or a solid material with a low heat conductivity. For example, asbestos, rubber or plastic may be used as a solid material. Gaseous mediums are also suitable however, and in this instance, the bearing assembly is a rather simplified construction and is economical to produce.

In accordance with another feature of the present invention, at least one air port is provided in the inner ring and/or the cap communicating with the space between the cap and flange and the outside environment. This arrangement provides a good convective exchange of the heated air in the space with the cool air of the environment. Furthermore, in a wheel bearing assembly where the wheel rim is fastened to the flange of the inner ring and the inner ring rotates, the air present in the space is conveyed radially outwardly through the air ports or openings formed between the radial section of the cap and the fastening flange by a centrifugal effect. Cooling air of the ball bearing environment is drawn through the air openings in the inner ring or in the cap into the spaces simultaneously.

In accordance with another feature of the present invention, means is provided for limiting the temperature rise of the cap notwithstanding how high the inner ring temperature attains. This is achieved by mounting a material having a relatively low melting temperature, for example, plastic or a low melting metal in the space between the cap and fastening flange. By this arrangement, when the inner ring is heated up for a short period of time, the heat energy of the fastening flange is consumed by the melting energy of the material in the space. For example, assuming the material has a melting temperature of 140° C., then the cap and the seal ring sliding on the cap can only be heated to 140° C. by reason of the protective material. As a result, the seal ring of the bearing has a high operating reliability and a long useful life. It is noted that instead of utilizing a plastic or low melting metal in the space, liquids such as oil which change their aggregate state from the liquid to the gaseous state when the highest permissable temperature is attained can also be utilized.

The specific configuration of the cap includes a radially extending center section and at least one axially extending centering extension. A cap of this configuration can be shaped rather easily and economically from strip material, for example, sheet metal by a non-cutting stamping and/or deep drawing operation. A cap of this configuration is easy to mount on the inner ring in order to support the cap in place.

In accordance with one embodiment of the invention, means such as asbestos having a low heat conductivity and good sealing properties is inserted in at least the space formed between the centering section of the cap and the inner ring. By this arrangement, heat conduction from the inner ring to the centering extension of the cap is inhibited. Furthermore, lubricant for the bearing is at the same time prevented from penetrating into the space between the flange and the cap and from there increasing the heat transfer from the inner ring to the cap as a result of its own heat conductivity and/or convection. Penetration of the lubricant would result in unfavorably high running temperatures of the cap and the seal ring sliding on the cap. The asbestos liner also serves the additional function by reason of its sealing properties of eliminating lubricant losses as a result of migration of the lubricant into the spaces.

BRIEF DESCRIPTION OF THE DRAWINGS

These and other objects of the present invention and various features and details of the operation and construction thereof are hereinafter more fully set forth with reference to the accompanying drawings, wherein.

DESCRIPTION OF THE PREFERRED EMBODIMENTS

Figure 1:
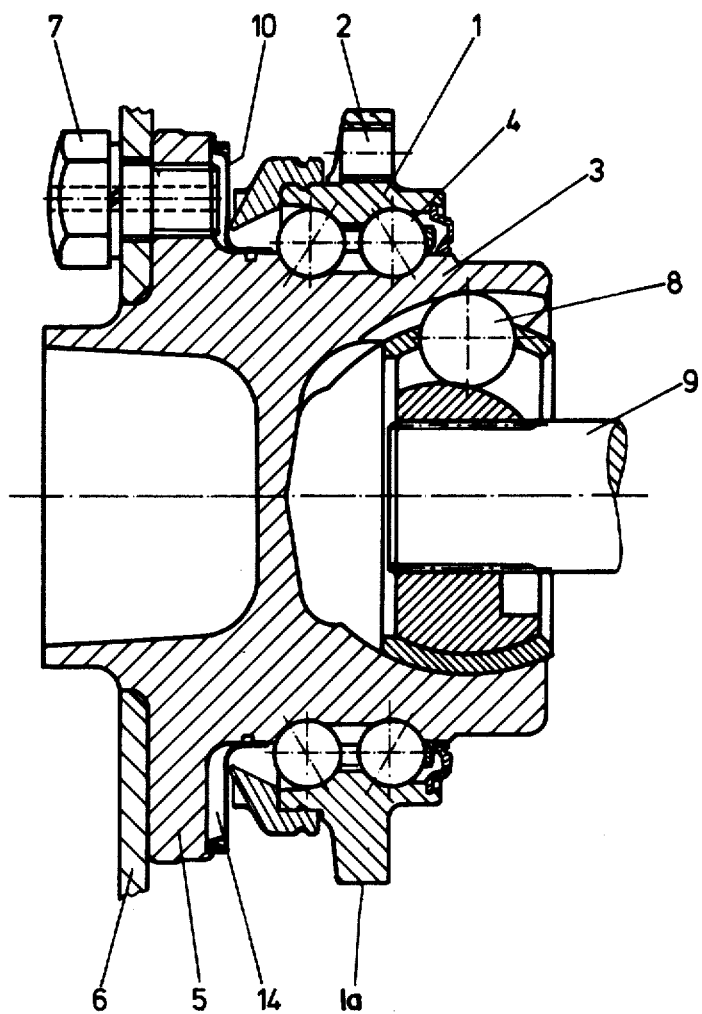
FIG. 1 is a fragmentary longitudinal sectional view through a wheel bearing assembly incorporating a roller bearing in accordance with the present invention.
Figure 2:
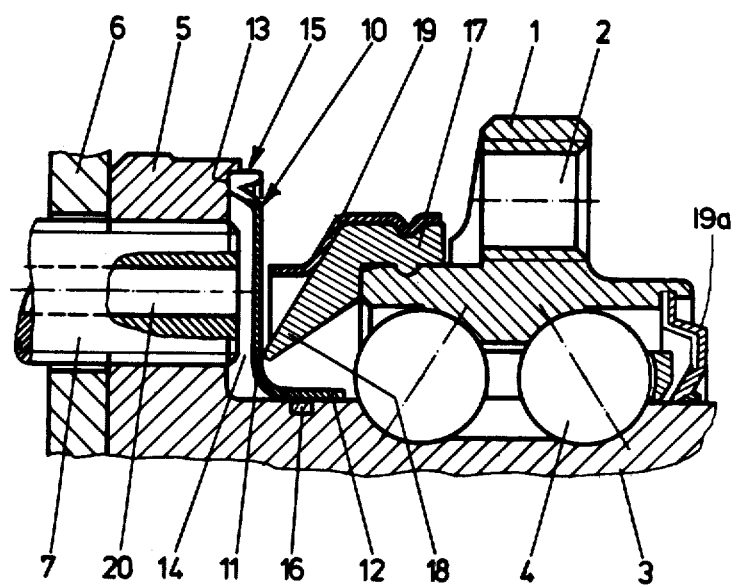
FIG. 2 is an enlarged fragmentary longitudinal section showing the details of the bearing.

Referring now to the drawings, and particularly to FIGS. 1 and 2 thereof, there is illustrated a rolling bearing for a wheel bearing assembly constructed in accordance with the present invention. The bearing comprises an outer ring 1 having a flange 1a with a series of circumferentially spaced axially oriented openings 2 for bolts to secure the outer ring to the chassis of a vehicle and a plurality of rolling elements, in the present instance, balls 4 arranged in two axially spaced rows between the confronting raceways of the outer ring 1 and the inner ring 3. As illustrated, the inner ring has a radially outwardly directed flange 5 spaced axially from the flange 1a of the outer ring with a series of circumferentially spaced threaded openings for fastening bolts 7 to secure the wheel rim on the face of the flange facing away from the outer ring.

The wheel assembly illustrated is a driven wheel assembly and to this end a universal joint 8 of conventional design coupled to a drive shaft 9 provided with a splined end is mounted in a cavity in the inner ring 3.

An annular cap member 10 is mounted in the space between the axial end of the outer ring 1 facing or confronting the flange 5. This cap may be manufactured most economically from strip material, for example, sheetmetal by a non-cutting stamping and deep drawing operation. The cap 10 has a radially directed section 11 which extends outwardly between the outer ring 1 and the fastening flange 5 and an axially directed centering section or extension 12, in this instance, supported on the land surface 3a out board of the raceway of the inner ring 3. The actuating section 12 is attached in a suitable manner for example, by a press fit or adhesive means or the like. Additionally, the annular cap 10 has axially recessed support sections 13 at the outer circumferential edge of the radial section 11 which as illustrated are axially supported on the flange at their free ends and secured thereto in the present instance by peening. This arrangement spaces the cap axially from the inner axial end face of the flange 5 to define an annular space 14 which may be filled with means to inhibit heat transfer from the inner ring 3 to the radial section 11 of the cap. In the present instance, the space is filled with air which has a low heat conductivity. The space 14 therefore, is defined radially inwardly by the outside surface of the inner ring 3 and the radial wall of the inner face of the flange 5 and extending to a point outboard of the circumferential openings for the bolt 7.

The peened sections 13 are distributed circumferentially over the outer peripheral edge of the cap to define a series of circumferentially spaced radial openings 15 which communicate with the ambient atmosphere.

The land surface 3a of the inner ring 3 is provided with a circumferentially extending groove 16 for a sealing ring preferrably made of rubber having low heat conductivity which seals the space 14 and also inhibits heat transfer from the inner ring 1 to the center section or extension 12 of the cap 10. The seal also precludes migration of lubricant in the outer space between the rings in the centering extension 12 and into the annular space 14.

An annular sealing ring 17 is supported on the outer ring 1 adjacent one axial end thereof proximate the flange 5 by means of a protective sleeve 19. The sealing ring has an inwardly convergent elastic sealing lip 18 which engages and slides on the radial section 11 of the cap 10 again sealing the bearing assembly at this axial end. The opposite axial end of the assembly is sealed by a conventional seal 19a which snaps in an annular groove in the outer ring. The free outer terminal edge of the protective sleeve 19 forms a narrow sealing slot with the radial section 11 of the cap 10. As illustrated, the sealing ring 17 is compressed radially inwardly by the protective sleeve 19 and securely held in place, in this instance, in a groove on the outer face of the ring into which the resilient material of the sealing ring 17 is compressed.

In the present instance, means is provided for circulating ambient air through the annular space 14. In this instance, this is accomplished by utilizing bolts 7 having an axial bore 20 providing an air conduit and communication between the cool air of the environment of the bearing in front of the wheel and the air in the space 14. In this manner, when the wheel rim 6 and inner ring rotate, the air in the space 14 between the cap 10 and the flange 5 is displaced in a circulatory or rotary motion. The radial openings 15 function in this instance like a centrifugal blower and move the air which is heated in the space 14 by the heat from the flange 5 radially outwardly. Simultaneously, a suction effect is generated in the radially inner part of the space 14. Consequently, cool environmental air is drawn in through the air ports 20 into the space 14. This effectively cools the radial section 11 of the cap 10 by reason of the air stream circulating through this space when the inner ring 3 rotates rapidly at high driving speeds of the vehicle and is heated considerably by friction in the disc brake (not shown) conventionally associated with the assembly, the balls 4 and/or the universal joint 8.

Figure 3:
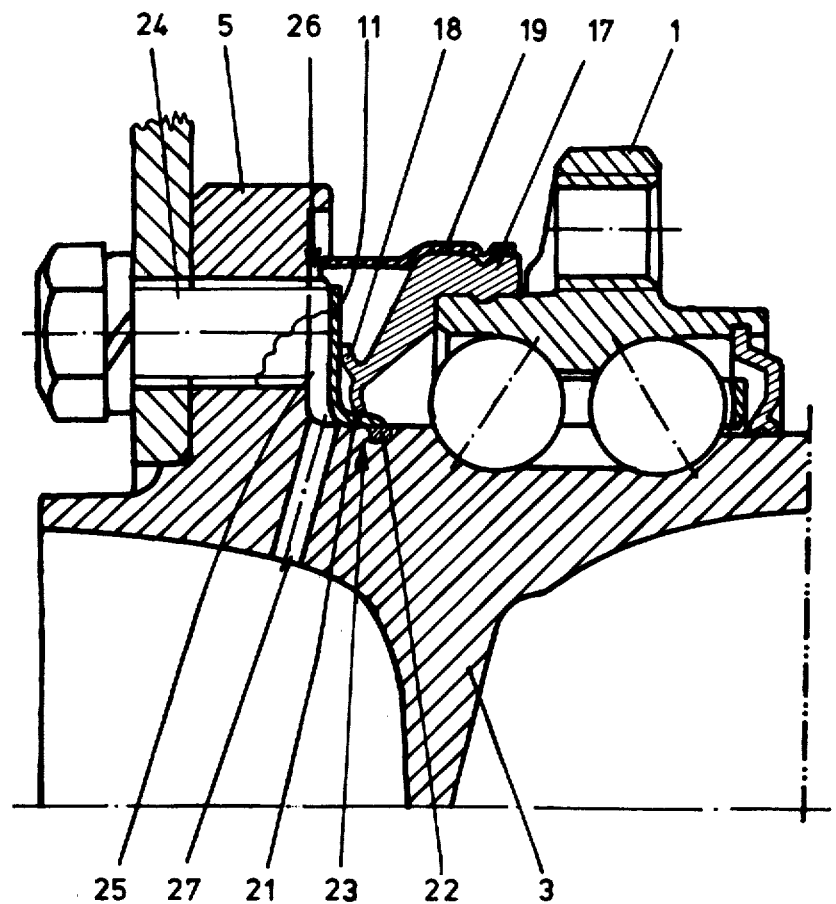
FIG. 3 is a fragmentary section of longitudinal sectional view similar to FIG. 2 showing a modified bearing for a wheel bearing assembly in accordance with the present invention.

FIG. 3 illustrates a modified bearing for a wheel bearing assembly, in accordance with the present invention. The structural details and arrangement of the assembly are generally similar to that illustrated in FIGS. 1 and 2 and consists therefore, of an inner ring 3 having a radially outwardly directed flange 5 for securing the wheel rim, an outer ring 1 with a flange for securing it to the chassis and plurality of rolling elements in the present instance, two rows of balls in the annular space between the rings. The annular space between the rings is likewise sealed by a sealing ring 17 held in place by a protective shield 19 which forms a narrow sealing slot with the flange 5 at its axially projecting outer free edge. In this instance, the sealing ring 17 has a bifurcated lip arrangement, the sealing lip 21 engaging the axial extension of the cap 11 and the sealing lip 18 engaging the radial extension thereof.

In this instance, the axial centering section 22 is secured on the land surface of the inner ring by peening its inner free terminal edge into a groove in the land surface. Spaces 25 having radial openings 26 are located about the periphery or formed between the radial section 11 of the cap 23 and the fastening flange 5, by the circumferentially spaced bolts 24. A radially directed air port 27 is provided in the inner ring which communicates at one end with the outside environment and at its opposite end with the spaces 25 between the cap 11 and the flange 5.

In operation, therefore, a good cooling of the radial section 11 and the axial centering extension 22 of the cap 23 is provided by cooling air which circulates from the environment radially outward through the air holes 27 to the spaces 25 and the adjacent opening of the rotating inner ring 3. As a result, the temperature-sensitive sealing lips 18 and 21 of the sealing ring 17 slide on relatively cool surfaces of the radial extension and centering section respectively of the cap 23.

Figure 4:
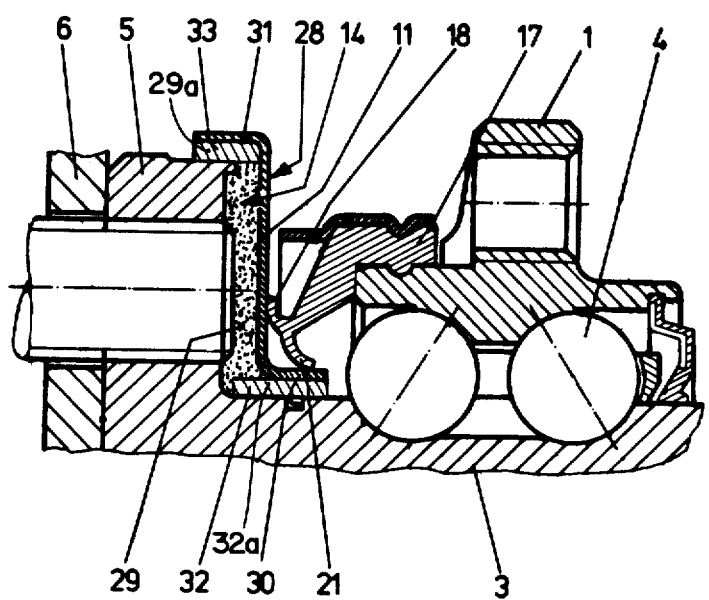
FIG. 4 is a fragmentary longitudinal sectional view showing a further modified bearing for a wheel bearing assembly in accordance with the present invention.

There is illustrated in FIG. 4 a further modified bearing for a wheel bearing assembly in accordance with the present invention which in overall structural details and arrangement is similar to the previously described embodiments. Thus, the bearing comprises an outer ring 1, an inner ring 3, and a plurality of rolling elements, balls 4 arranged in two rows in the annular space between the rings. The sealing ring 17 is similar to that illustrated in FIG. 3 and includes bifurcated sealing lips 18 and 21 which slide on the cap 28. As in the previously described embodiments, cap 28 is mounted in a manner to provide a space 14 between the axial end face of the flange 5 facing the outer ring. In the present instance, however, the space 14 is filled with a member 29 to inhibit heat transfer from the inner ring 3 to the cap 28 after attaining a highest permissible operating temperature of the inner ring 3. This member 29 may consist of a construction material, for example, plastic or a lead-zinc alloy which melts at the highest permissible operating temperature of the cap 28.

The cap as illustrated is of Z-shaped cross section thereby defining a radial section 11 and an outer axially extending centering section 33 overlying the flange 5 and an inner axial centering section 30 pointing toward the rolling elements. An annular space 32 is formed between the centering section 30 of the cap 28 and the inner ring. Means to inhibit heat transfer from the inner ring to the cap 28 is inserted in the annular space 32 which consists in the present instance of an asbestos sleeve 32a which has a low heat conductivity. A heat resistant sleeve for example made of asbestos is located in the space between the outer axial centering section 31 and the flange 5 of the inner ring 3. In this manner, the space 14 with the filler means 29 is sealed toward the outside by the asbestos sleeves in the spaces 32 and 33. The insulating means 29 which liquifies at the highest permissible operating temperature of the cap 28 can therefore now flow toward the outside from the space 14.

Considering now operation of the assembly, during a braking process of the disc brake of the wheel bearing assembly, the inner ring 3 is subjected to a high amount of heat and is therefor raised to an elevated temperature for a short period of time. Overheating of the temperature sensitive seal ring 17 with corresponding wear of the sealing lips 18 and 21 on the cap 28 is prevented in this instance since the radial section 11 of the cap 28 and thus also the immediately adjacent centering sections 30 and 31 can only be heated up to the melting temperature of the temperature barrier means 29. The melting temperature of the means 29 is about 15 to 20 centigrades less than the degradation temperature of the seal ring 17.

Even though particular embodiments to the present invention have been illustrated and described herein, it is not intended to limit the invention and changes and modifications may be made therein within the scope of the inventive concept. For example, the space between the axial centering section overlying the flange 5 in the FIG. 4 embodiment does not have to be filled and sealed with an asbestos sleeve. An empty space filled with air can also be utilized. Also, the space 33 can be filled with the same heat barrier means 29 as is space 14 between the radial section cap and the flange 5. When the highest permissible operating temperature of the cap 28 is attained, material which will melt is then present in the two adjacent spaces. When the temperature of the inner ring is elevated considerably, the space 14 between the radial section of the cap 28 and the flange of the rotating inner ring which is cooled less will heat up first so that the barrier means 29 present in this space melts. By contrast the temperature barrier means 29a present in the space 33 between the axial centering extension 31 and the flange also gradually melts with a further increase in heat although this is cooled more than the space 14 at a higher rotating speed and closer access to the ambient air. However, if the extremely high heat supply from the inner ring to the two spaces 14, 33 continues the barrier means 29 present in the space 33 melts so that the completely liquified means is swung radially outwardly from the two spaces and the spaces are automatically filled with outside air which is a gaseous medium with extremely low heat conductivity. The heat transfer from the inner ring to the cap is then also extensively inhibited by convection of the cooling air moving in the spaces 14 and 33 so that the seal ring 17 with its sealing lips 18 and 22 slides on a comparatively cool cap 28 as compared to the inner ring although the inner ring has been heated up for a comparatively prolonged period of time, for example, as a result of continuous braking.

Furthermore, the material which melts or boils at the highest permissible temperature of the assembly and which inhibits the heat transfer from the inner ring to the cap can also be inserted in the space between the inner ring and the cap which is additionally filled on the side of the bearing by a material with low heat conductivity, for example, asbestos. In this way, the material on direct contact with the cap is only changed in its aggregate state when the inner ring has an extremely high operating temperature and a correspondingly large amount of heat is transferred to the melting or boiling material through the material with low heat conductivity.

What is claimed is:

1. In a bearing assembly particularly for wheel bearings comprising an inner ring having at least one radially outwardly directed fastening flange, an outer ring spaced radially from the inner ring defining an annular space therebetween and having an axial end face spaced axially from said fastening flange, a plurality of rolling elements in the annular space between the rings, a cap secured to the inner ring having a radial section extending between the outer ring and fastening flange and having at least a portion thereof spaced axially from the radial face of said fastening flange to define a space therebetween and a seal ring fastened to the outer ring having a sealing lip which slides on the cap, said space between the radial cap section and the fastening flange of said inner ring being filled at least partly with means to inhibit heat transfer from the inner ring to the cap.

2. In a bearing assembly as claimed in claim 1 wherein said means which inhibits heat transfer from the inner ring to the cap is formed at least partly by a solid material having a low heat conductivity.

3. In a bearing assembly as claimed in claim 1 wherein said means which inhibit heat transfer from the inner ring to the cap is air circulating through the space between said radial face of said fastening flange and said radial section of said cap.

4. In a bearing assembly as claimed in claim 1 including at least one air port in the inner ring which communicates with said space and with the environment of the bearing.

5. In a bearing assembly as claimed in claim 1 wherein at least one opening is formed at the radially outer end of said space between the radial section of the cap and the fastening flange of the inner ring which is in communication with the environment of the bearing.

6. In a bearing assembly as claimed in claim 1 including a member which inhibits heat transfer from the inner ring to the cap mounted in the space between the radial section of the cap and the radial face of said flange, said member changing its aggregate state when the highest permissible operating temperature of the cap is attained.

7. In a bearing assembly as claimed in claim 1 wherein the cap has an axial centering extension extending from its inner peripheral edge.

8. In a bearing assembly as claimed in claim 1 wherein the cap has an axial centering extension extending from the outer peripheral edge of the radial section.

9. In a bearing assembly as claimed in claim 1 wherein said cap includes an axial centering extension at the inner terminal end of said radial section and a member of low heat conductivity having sealing properties disposed between the centering extension and said inner ring.

10. In a bearing assembly as claimed in claim 1 including bolts for securing a wheel rim to said fastening flange, each of said bolts having an axial bore therethrough communicating at one end with said space between said flange and cap to provide for circulating a cooling medium through said space.

11. In a bearing assembly as claimed in claim 1 wherein the outer periphery of the radial section of said cap is staked to said fastening flange at a plurality of circumferentially spaced locations to provide air passages for circulation of a cooling medium through said space.

* * * * *